United States Patent
Magaña et al.

(10) Patent No.: US 10,037,035 B2
(45) Date of Patent: Jul. 31, 2018

(54) METHODS AND APPARATUS FOR POSITIONING AIRCRAFT BASED ON IMAGES OF MOBILE TARGETS

(71) Applicant: The Boeing Company, Chicago, IL (US)

(72) Inventors: Enrique Casado Magaña, Madrid (ES); David Scarlatti, Madrid (ES); David Esteban Campillo, Madrid (ES); Jesús Iván Maza Alcañiz, Cadiz (ES); Fernando Caballero Benitez, Sevilla (ES)

(73) Assignee: The Boeing Company, Chicago, IL (US)

( * ) Notice: Subject to any disclaimer, the term of this patent is extended or adjusted under 35 U.S.C. 154(b) by 45 days.

(21) Appl. No.: 15/217,567

(22) Filed: Jul. 22, 2016

(65) Prior Publication Data
US 2017/0023941 A1   Jan. 26, 2017

(30) Foreign Application Priority Data
Jul. 23, 2015   (EP) .................................... 15382382

(51) Int. Cl.
*B64C 39/00* (2006.01)
*G01C 23/00* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
USPC ...................... 700/3–18, 300, 408, 469, 495
See application file for complete search history.

(56) References Cited

U.S. PATENT DOCUMENTS

| 6,349,898 B1 * | 2/2002 | Leonard | F41G 7/007 244/3.11 |
| 8,990,002 B1 * | 3/2015 | Leonard | G01S 5/0284 367/1 |

(Continued)

OTHER PUBLICATIONS

Torrieri, "Statistical Theory of Passive Location Systems," IEEE Transactions on Aerospace and Electonic Systems, vol. AES-20, No. 2, Mar. 1984 (16 pages).

(Continued)

*Primary Examiner* — Jonathan L Sample
(74) *Attorney, Agent, or Firm* — Hanley, Flight & Zimmerman, LLC (57) ABSTRACT

Methods and apparatus for positioning aircraft based on images of mobile targets are disclosed. An example method includes identifying, by executing first instructions via a processor, a mobile target in an image obtained by a camera mounted on a first aircraft and obtaining, by executing second instructions via the processor, current coordinates of the first aircraft. The example method includes determining, by executing third instructions via the processor, coordinates of the mobile target based on the coordinates of the first aircraft and the image. The coordinates of the mobile target are within an area of uncertainty. The example method includes determining, by executing fourth instructions via the processor, a first position for the first aircraft that reduces the area of uncertainty of the coordinates of the mobile target.

20 Claims, 4 Drawing Sheets

(51) Int. Cl.
*G05D 1/00* (2006.01)
*B64C 39/02* (2006.01)
*B64D 47/08* (2006.01)
*G08G 5/00* (2006.01)
*G05D 1/10* (2006.01)

(52) U.S. Cl.
CPC ........... *G05D 1/104* (2013.01); *G08G 5/0078* (2013.01); *B64C 2201/024* (2013.01); *B64C 2201/127* (2013.01)

(56) References Cited

U.S. PATENT DOCUMENTS

| | | | | |
|---|---|---|---|---|
| 9,194,948 | B1* | 11/2015 | Leonard | G01S 7/41 |
| 9,607,219 | B2* | 3/2017 | Greveson | G06K 9/00476 |
| 9,626,874 | B1* | 4/2017 | Gupta | G08G 5/0069 |
| 9,746,554 | B2* | 8/2017 | Millar | G01S 13/89 |
| 2004/0165775 | A1* | 8/2004 | Simon | G06K 9/6211 |
| | | | | 382/181 |
| 2005/0273254 | A1* | 12/2005 | Malchi | G01C 21/005 |
| | | | | 702/152 |
| 2007/0010965 | A1* | 1/2007 | Malchi | G01C 3/06 |
| | | | | 702/151 |
| 2009/0021423 | A1* | 1/2009 | Cheng | G01S 7/003 |
| | | | | 342/25 A |
| 2009/0262977 | A1* | 10/2009 | Huang | G06T 7/20 |
| | | | | 382/103 |
| 2010/0017046 | A1* | 1/2010 | Cheung | G01S 7/003 |
| | | | | 701/2 |
| 2010/0092079 | A1* | 4/2010 | Aller | G06K 9/3216 |
| | | | | 382/165 |
| 2010/0116886 | A1* | 5/2010 | Flowers | F41G 7/008 |
| | | | | 235/404 |
| 2011/0299730 | A1* | 12/2011 | Elinas | G06K 9/00791 |
| | | | | 382/103 |
| 2012/0123628 | A1* | 5/2012 | Duggan | G05D 1/0061 |
| | | | | 701/24 |
| 2013/0259304 | A1* | 10/2013 | Aller | G06K 9/3216 |
| | | | | 382/103 |
| 2013/0317667 | A1* | 11/2013 | Kruglick | B64C 39/024 |
| | | | | 701/2 |
| 2015/0248584 | A1* | 9/2015 | Greveson | G06K 9/00476 |
| | | | | 382/113 |
| 2015/0371431 | A1* | 12/2015 | Korb | G06T 9/00 |
| | | | | 382/113 |
| 2016/0085238 | A1* | 3/2016 | Hayes | G08G 5/0026 |
| | | | | 701/8 |
| 2016/0349363 | A1* | 12/2016 | Millar | G01S 13/89 |
| 2017/0102467 | A1* | 4/2017 | Nielsen | G01S 19/47 |

OTHER PUBLICATIONS

Regina, "New Target Tracking and Monitoring Guidance Laws for UAV," Dipartimento di Elettronica, Informatica e Sistemistica Viale Risorgimento 2, Bologna, Italy, Mar. 3, 2011 (175 pages).

Forssén, "Low and Medium Level Vision using Channel Representation," Department of Electrical Engineering Linköping University, Linköping, Sweden, Mar. 2004 (164 pages).

Gomez-Balderas, "Tracking a Ground Moving Target with a Quadrotor Using Switching Control", International conference on Unmanned Aircraft Systems (ICUAS 2012), Philadelphia, PA, Jun. 2012 (11 pages).

Sang, "Planning Algorithm Based on Airborne Sensor for UAV to Track and Intercept Moving Target in Dynamic Environment", Proceedings of 2014 IEEE Chinese Guidance, Navigation and Control Conference, Yantai, China, Aug. 8-10, 2014 (6 pages).

Choi, "Tracking an Unknown Moving Target from UAV", Proceedings of the 5th International Conference on Automation, Robotics and Applications, Wellington, New Zealand, Dec. 6-8, 2011 (6 pages).

Morbidi, "Active Target Tracking and Cooperative Localization for Teams of Aerial Vehicles", IEEE Transactions on Control Systems Technology, vol. 21, No. 5, Sep. 2013 (14 pages).

Frew, "Cooperative Standoff Tracking of Uncertain Moving Targets using Active Robot Networks", 2007 IEEE International Conference on Robotics and Automation, Rome, Italy, Apr. 10-14, 2007 (6 pages).

Spica, "Aerial Grasping of a Moving Target with a Quadrotor UAV", 2012 IEEE/RSJ International Conference on Intelligent Robots and Systems, Vilamoura, Algarve, Portugal, Oct. 7-12, 2012 (8 pages).

* cited by examiner

METHODS AND APPARATUS FOR POSITIONING AIRCRAFT BASED ON IMAGES OF MOBILE TARGETS

CROSS-REFERENCE TO RELATED APPLICATIONS

This patent claims priority to European Application Number EP15382382, filed on Jul. 23, 2015, which is incorporated herein by reference in its entirety.

FIELD OF THE DISCLOSURE

This patent relates generally to positioning aircraft and, more particularly, to methods and apparatus for positioning aircraft based on images of mobile targets.

BACKGROUND

Mobile objects (e.g., people, land vehicles, water vehicles, etc.) are often tracked by aircraft. Recently, unmanned aircraft have been utilized to track the mobile objects. These unmanned aircraft include cameras that enable the mobile objects to be identified and/or tracked. In some examples, the unmanned aircraft are planes that circle the tracked mobile objects and/or perform other maneuvers to track the mobile objects.

SUMMARY

In one example, a method includes identifying, by executing first instructions via a processor, a mobile target in an image obtained by a camera mounted on a first aircraft and obtaining, by executing second instructions via the processor, current coordinates of the first aircraft. The method includes determining, by executing third instructions via the processor, coordinates of the mobile target based on the coordinates of the first aircraft and the image. The coordinates of the mobile target are within an area of uncertainty. The method includes determining, by executing fourth instructions via the processor, a first position for the first aircraft that reduces the area of uncertainty of the coordinates of the mobile target.

In another example, an apparatus includes a camera mounted to an aircraft to obtain an image. The apparatus includes a processor of the aircraft to identify a mobile target in the image obtained by the camera, obtain current coordinates of the aircraft, and determine coordinates of the mobile target based on the coordinates of the aircraft and the image. The coordinates of the mobile target is within an area of uncertainty. The processor of the aircraft is to determine a position for the aircraft that reduces the area of uncertainty of the coordinates of the mobile target and instruct the aircraft to move to the position to reduce the area of uncertainty.

In another example, an apparatus includes means for obtaining an image mounted to an aircraft. The apparatus includes means for determining a position of the aircraft to identify a mobile target in an image obtained by the means for obtaining an image, obtain current coordinates of the aircraft, determine coordinates of the mobile target and an area of uncertainty based on the coordinates of the aircraft and the image, and determine a position for the aircraft that reduces the area of uncertainty. The apparatus includes means for moving the aircraft to the position to reduce the area of uncertainty.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Mobile objects are often tracked by aircraft. For example, mobile objects that travel along land (e.g., people, animals, land vehicles, etc.) and/or water (e.g., people, animals, water vehicles, etc.) may be tracked by aircraft. Unmanned aircraft are now being utilized to track mobile objects. In some examples, the unmanned aircraft are piloted and/or controlled by a person in a remote location (e.g., via radio control and/or a human-machine interface). Other example unmanned aircraft automatically track and/or follow mobile objects without human intervention (e.g., without a pilot within and/or remote from the aircraft). To enable such unmanned aircraft to identify and/or track the mobile objects, the unmanned aircraft include cameras that obtain images of the mobile objects. Some known unmanned aircraft that track mobile objects without human intervention include planes with cameras that obtain images of the mobile objects. In some instances, the unmanned planes may perform complicated maneuvers to continue to track the mobile objects. For example, because planes must move continuously, the unmanned planes may attempt to circle around (e.g., in an elliptical trajectory) a mobile object that becomes stationary and/or moves at a slow rate (e.g., slower than the unmanned planes is able to travel). In some instances, the maneuvers performed by the unmanned plane cause the unmanned plane to lose and/or determine inaccurate coordinates of the mobile object.

The example apparatus and methods disclosed herein determine a position (e.g., a stationary position) and/or orientation at which an unmanned aircraft is able to accurately determine and/or track coordinates of a mobile target. For example, the apparatus and methods disclosed herein determine a position and an orientation at which an unmanned helicopter and/or other unmanned rotocraft may be able to be positioned (e.g., by hovering) to accurately track a mobile target without having to perform difficult flight maneuvers. Further, by monitoring the mobile target from the stationary position, the example methods and apparatus disclosed herein reduce an amount of processing performed (e.g., by a processor such as a microcontroller or microcontroller unit) to determine coordinates of the mobile target by collecting data (e.g., from images obtained from a camera of the aircraft) from a stationary (e.g., not moving) reference point.

The examples disclosed herein include identifying a mobile target in an image obtained by a camera (e.g., a first camera) mounted on an aircraft (e.g., a first aircraft) and obtaining current coordinates of the aircraft. For example, the current coordinates are obtained from data received via a global positioning sensor in communication with the processor of the aircraft. Further, in the examples disclosed herein, coordinates are determined for the mobile target based on the coordinates of the aircraft and the image obtained from the camera. The coordinates of the mobile target are within an area of uncertainty (e.g., resulting from margins of error of the obtained data). Further, a first position and/or first orientation for the aircraft are determined that reduce (e g, minimizes) the area uncertainty of the coordinates of the mobile target when the aircraft is tracking the mobile target. In some examples, the aircraft is instructed to move to the first position and/or first orientation (e.g., via an autopilot system of the aircraft). For example, the aircraft is moved to the first position to enable the camera of the aircraft to obtain a second image in which the mobile target is centered (e.g., is in a principal position) to further reduce (e.g., minimize) the area of uncertainty in tracking the mobile target.

In some examples, the coordinates of the mobile target are 3-dimensional coordinates that are determined based 3-dimensional reference coordinates of the aircraft and the 2-dimensional image obtained by the camera of the aircraft. Additionally or alternatively, a distance between the aircraft and/or the camera of the aircraft is determined and utilized to determine the coordinates of the mobile target. Further, a size, a color and/or a velocity of the mobile target may be determined based on the image obtained by the camera to determine a classification of the mobile target to further reduce the area of uncertainty and/or enable the aircraft to track the mobile target. In such examples, a vector is formed that includes information related to the mobile target such as size, color, velocity, weight, class, position, etc.

The first position of the aircraft may be based on the coordinates of the aircraft, the coordinates of the mobile target, the image obtained by the camera, a focal length of the camera, an angle of the camera relative to a fuselage of the aircraft and/or a yaw of the aircraft. Further, the area of uncertainty of the coordinates of the mobile target may have an elliptical shape that includes a major axis and a minor axis. For example, the first position of the aircraft that reduces the area of uncertainty is orthogonal to the major axis and/or along the minor axis. In some examples, two positions are identified for the aircraft that would minimize the area of uncertainty and are orthogonal to the major axis and/or along the minor axis. In such examples, the aircraft is instructed to move to the position that is closest to the current coordinates of the aircraft.

In some examples, the mobile target is identified and/or tracked based on a second image obtained by another camera (e.g., a second camera) mounted on another aircraft (e.g., a second aircraft). In such examples, current coordinates of the other aircraft are obtained and a second position for the other aircraft is determined that would further reduce the area of uncertainty of the coordinates of the mobile target. For example, the second position for the other aircraft is orthogonal to the minor axis and/or along the major axis of the area of uncertainty when the first position of the initial aircraft is orthogonal to the major axis and/or along the minor axis.

Further, in some examples, images of a mobile target are analyzed to position aircraft by identifying a mobile target in an image obtained via a camera mounted on an aircraft, determining (e.g., via internal sensors in communication with the processor of the aircraft) coordinates of the aircraft with respect to a Global Reference System, determining coordinates of the mobile target with respect to the Global Reference System, determining an area of uncertainty associated with the coordinates of the mobile target, and determining a first position of the aircraft from which to monitor the mobile target that minimizes the area of uncertainty associated with the coordinates of the mobile target. For example, to determine the coordinates of the mobile target with respect to the Global Reference System, a distance between the aircraft and the mobile target is determined (e.g., via a sensor such as a telemeter and/or a laser telemeter that is mounted on the aircraft and in communication with the processor), coordinates of the mobile target are determined with respect to axes of the image of the camera, an angle of the camera relative to a fuselage of the aircraft (e.g., a fixed angle, an adjustable angle) is determined, an orientation of the aircraft (e.g., a yaw angle) relative to the Global Positioning System is determined (e.g., via a sensor, such as a gyroscope, of the aircraft that is in communication with the processor of the aircraft), and the coordinates of the mobile target in the image (e.g., 2-dimensional coordinates) are transformed into coordinates of the mobile target relative to the Global Positioning System (e.g., 3-dimensional coordinates).

Further, in some examples, a real-time position of an aircraft of a fleet of aircraft may be known, in real-time, to the other aircraft of the fleet to enable the aircraft to be positioned relative to each other in an efficient manner for tracking and/or monitoring the mobile target. For example, the aircraft of the fleet that is closer and/or is able to more easily move to the first position to monitor the mobile device moves to the first position. Further, the fleet of aircraft may take into account characteristics of the aircraft (e.g., maximum velocity, fuel level, etc.) when determining which aircraft is to move to the first position. If it is determined that an aircraft is not in a condition to track a mobile target, the aircraft may be instructed to return to a base to address and/or resolve the conditions of the aircraft.

Thus, the examples disclosed herein enable aerial tracking of a mobile target by an unmanned aircraft that remains suspended at a fixed position without operator intervention by determining a position at which the aircraft is able to monitor the mobile target with a least amount of uncertainty with respect to determined coordinates of the mobile target.

Figure 1:
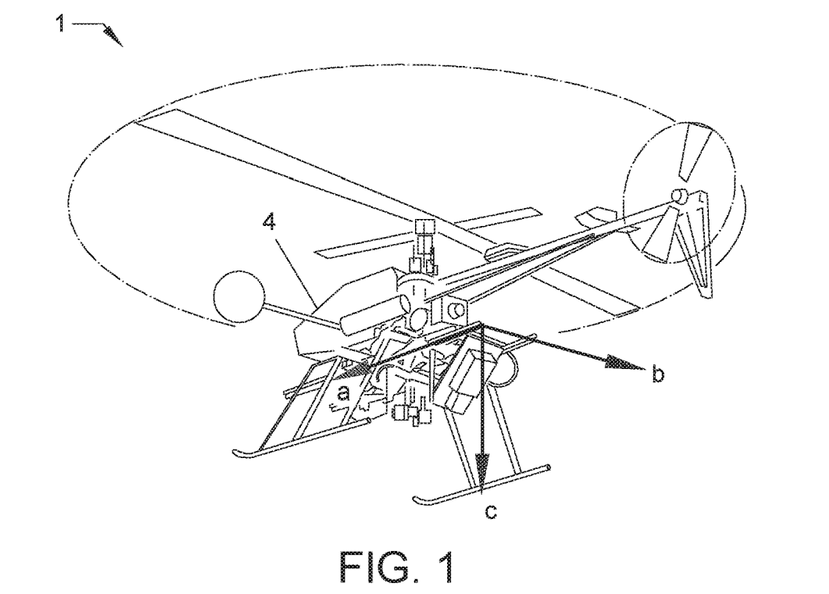
FIG. 1 illustrates an example aircraft in accordance with the teachings of this disclosure.

FIG. 1 illustrates an example aircraft 1 in accordance with the teachings herein. In the illustrated example, the aircraft 1 is a helicopter and/or another type of rotocraft. As illustrated in FIG. 1, a fuselage 4 of the aircraft 1 is oriented in relation to an $\hat{a}$ axis, a $\hat{b}$ axis, and a $\hat{c}$ axis. The orientation of the fuselage 4 about the $\hat{a}$ axis defines a roll angle of the aircraft 1, the orientation about the $\hat{b}$ axis defines a pitch angle of the aircraft 1, and the orientation about the $\hat{c}$ axis defines a yaw angle of the aircraft 1. In the illustrated example, the roll angle, the pitch angle, and the yaw angle are approximately 0 degrees.

Figure 2:
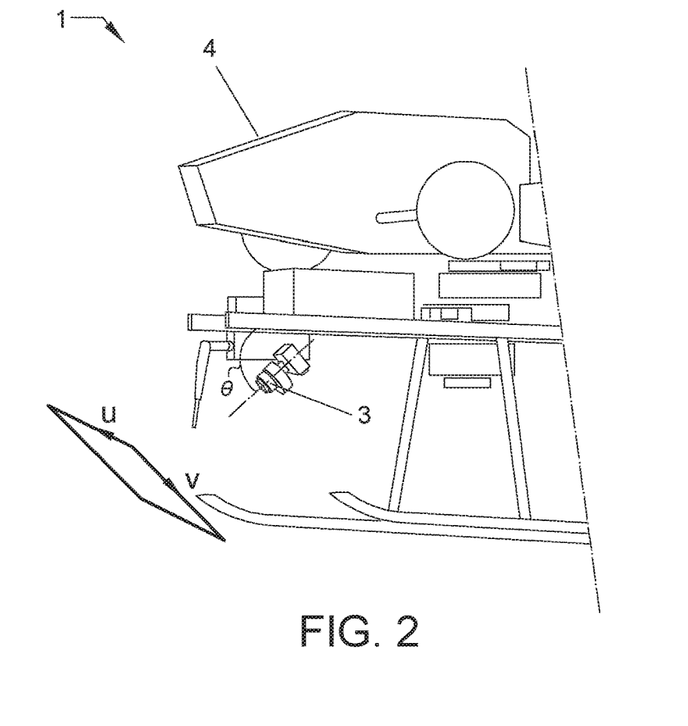
FIG. 2 illustrates an example camera coupled to the aircraft of FIG. 1.

FIG. 2 illustrates a camera 3 of the aircraft 1 that is mounted, attached and/or otherwise coupled to the fuselage 4 of the aircraft 1. The camera 3 obtains images of land/or water below the aircraft 1 to enable the aircraft 1 to identify and/or track mobile objects (e.g., a mobile target 2 of FIGS. 3 and 4) travelling along the land and/or water. In the illustrated example, the camera 3 is coupled to a lower portion of the fuselage 4 to enable the camera 3 to obtain images without obstruction from the fuselage 4. For example, the camera 3 has a focal length that affects the images obtained by the camera 3. Further, the camera 3 is oriented at an angle θ relative to the fuselage 4 of the aircraft 1 to affect what is included in the images obtained by the camera 3. In the illustrated example, the camera 3 is orientated at the angle θ such that an image obtained by the camera 3 extends along a $\hat{u}$ axis and a $\hat{v}$ axis. Further, in some examples in which the camera 3 is oriented relative to the ground at a non-perpendicular angle, the image obtained by the camera 3 may be skewed.

Figure 3:
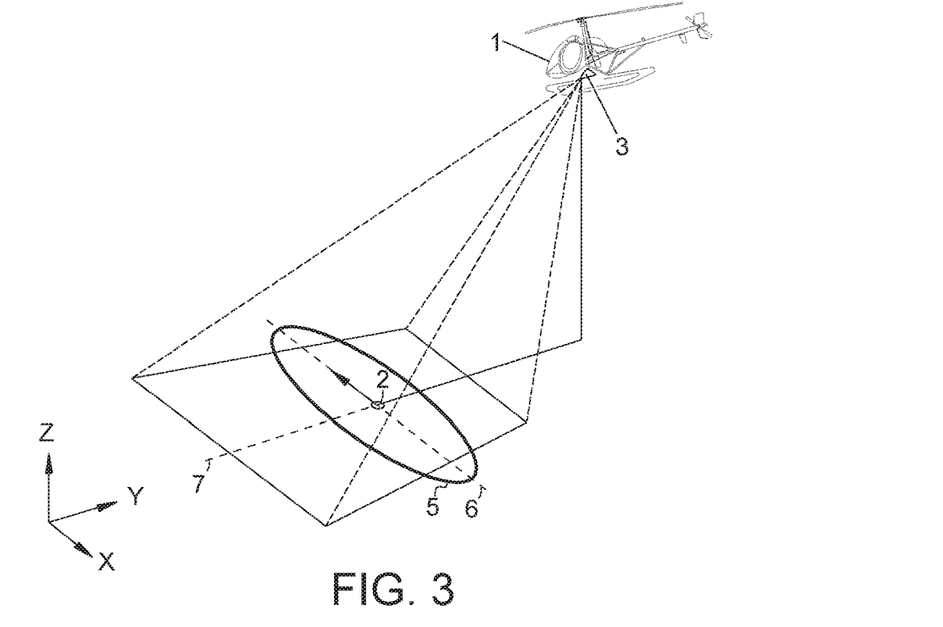
FIG. 3 illustrates the aircraft of FIG. 1 positioned to reduce an example area of uncertainty for coordinates of an example mobile target in accordance with the teachings of his disclosure.

FIG. 3 illustrates the aircraft 1 at a first position to track an example mobile target 2 in accordance with the teachings of his disclosure. More specifically, the aircraft 1 is positioned to reduce (e.g., minimize) an area of uncertainty 5 associated with calculated coordinates of the mobile target 2 to enable the aircraft 1 to accurately track and/or monitor the mobile target 2 from a stationary position.

For example, to reduce the area of uncertainty 5 associated with the coordinates of the mobile target 2, the mobile target 2 is identified in an image obtained by the camera 3 and current coordinates of the aircraft 1 are obtained from a sensor (e.g., a global positioning sensor) of the aircraft 1. Coordinates of the mobile target 2 are calculated and/or determined based on the current coordinates of the aircraft 1 and the image obtained by the camera 3. Further, the area of uncertainty 5 associated with the determined coordinates of the mobile target 2 and a target position (e.g., a first position) and/or orientation (e.g., a first orientation) that reduces the area of uncertainty 5 are determined to enable the mobile target 2 to be tracked. In some examples, the aircraft 1 may be instructed to move to the first position and/or a first orientation to reduce the area of uncertainty 5. Additionally or alternatively, the camera 3 and sensor(s) of the aircraft 1 are in communication with a processor (e.g., a microcontroller unit) of the aircraft to enable the processor to determine the first position and/or the first orientation that reduces the area of uncertainty 5 and/or to instruct the aircraft 1 to move to the first position (e.g., via autopilot, without human intervention, etc.). For example, when the aircraft 1 is at the first position in the first orientation, the aircraft 1 is able to track the mobile target 2 such that the mobile target 2 remains in a principal position (e.g. the center of the image) of the field of vision of the camera 3. In some examples, the camera 3 is fixed relative to the fuselage 4 of the aircraft 1 without independent control of the camera 3. In other examples, the camera 3 camera is movable and/or controllable such that an orientation of the camera 3 relative to the fuselage 4 is adjustable.

In some examples, there may be more than one mobile target (e.g., the mobile target 2 and another mobile target) identified and/or tracked via the images obtained by the camera 3 of the aircraft 1. In such examples, each of the mobile targets is identified by their respective characteristics (e.g., shape, color, velocity, etc.). For example, the characteristics of the mobile targets are measured by conventional perception systems of the camera 3 and/or the aircraft 1. In some examples, a state vector, $\vec{b}$, is determined and/or defined for each of the mobile targets and includes the identified characteristics of the respective mobile target. The state vectors of the respective mobile targets enable the aircraft 1 to distinguish the mobile targets from each other.

For example, a state vector, $\vec{b_k(t)}$, is determined for a mobile target, k (e.g., the mobile target 2). The state vector includes dynamic characteristic(s) (e.g., position, velocity, etc.) of the mobile target, k, and static characteristics (e.g., color, size, etc.) of the mobile target, k, that enable the mobile target, k, to be classified into a predetermined class.

For example, the state vector, $\vec{b_k(t)}$, is expressed as provided below in Equation 1:

$$\vec{b_k}(t) = \begin{bmatrix} p_k(t) \\ \dot{p}_k(t) \\ \theta_k \end{bmatrix} \quad \text{Equation 1}$$

In Equation 1 provided above, $p_k$ represents a position of the mobile target, $\dot{p}_k$ represents a velocity of the mobile target, and $\theta_k$ represents static characteristics of the mobile target.

For a tracking mission in which there is a plurality of mobile targets, there is one state vector $\vec{B}(t)=[\vec{b_1}(t) \ldots \vec{b_k}(t) \ldots \vec{b_N}(t)]$, which includes the respective states of each of the mobile targets 1 through N.

The characteristics and/or information regarding the states of the respective mobile targets are determined based on measurements taken and/or data collected by a perception system of the aircraft 1 (e.g., the camera 3 and/or other sensors) and/or the perception systems of other aircraft (e.g., an aircraft 8 of FIG. 4) of a fleet of aircraft. The state of a mobile target is utilized to track the mobile target such that the mobile target is maintained in a center of an image (e.g., a principal position) taken by a camera of an aircraft tracking the object. For example, the aircraft 1 utilizes the state of the mobile target 2 to center the mobile object 2 in an image obtained by the camera 3 of the aircraft 1.

In some examples, margins of error in measurements (e.g., based on images obtained by the camera 3) result in an uncertainty in the estimation of the state of the mobile target 2. In the illustrated example, the uncertainty of a location of the mobile target 2 is represented by the area of uncertainty 5. The area of uncertainty 5 of the mobile target 2 has an associated covariance matrix, Σ. A covariance matrix is a conventional term utilized when instruments are subjected to errors and/or tolerances in measurements and/or estimations. In the illustrated example, the covariance matrix, Σ, is an ellipsoid. Axes of the ellipsoid have a standard deviation, 3σ, with respect to an estimation of the position of the mobile target 2. Further, the covariance matrix Σ is determined based on noise characteristics of the sensors of the aircraft 1 and/or methods utilized to estimate the first position of the aircraft 1 (e.g., noise characteristics from a position of the camera 3 with respect the aircraft 1, a position of the aircraft 1, an orientation of the aircraft 1, uncertainty of detection of the mobile target 2 in image(s), etc.).

In the illustrated example, the coordinates of the first position of the aircraft 1 that minimizes the area of uncertainty 5 is represented by $$\vec{M_w} = \begin{bmatrix} x_w \\ y_w \\ z_w \end{bmatrix}.$$

The orientation of the aircraft 1 that reduces the area of uncertainty 5 at the first position is represented by a roll angle, $\gamma_w$, a pitch angle, $\beta_w$, and a yaw angle, $\alpha_w$. Further, the current or initial coordinates of the aircraft 1 is represented by $$\begin{bmatrix} x_0 \\ y_0 \\ z_0 \end{bmatrix}.$$

$\vec{M}_w$, the roll angle, $\gamma_w$, the pitch angle, $\beta_w$, and the yaw angle, $\alpha_w$, are calculated based on estimated coordinates, $\vec{M}_t$, of the mobile target 2 and the corresponding area of uncertainty 5. The estimated coordinates, $\vec{M}_t$, of the mobile target 2 equal $$\begin{bmatrix} x_t \\ y_t \\ z_t \end{bmatrix}$$

in a Global Reference System (e.g., established via coordinates of the Universal Transverse Mercator (UTM)) and are determined based on coordinates $u_t$ and $v_t$ associated with pixels of the image obtained from the camera 3 of the aircraft 1. For example, the coordinates $u_t$ and $v_t$ are expressed as a function of the axes $\hat{u}$ and $\hat{v}$ of the image of the camera 3. Provided below in Equation 2 is a bidimensional vector containing the coordinates of the image:

$$\vec{m}_t = \begin{bmatrix} u_t \\ v_t \end{bmatrix} \quad \text{Equation 2}$$

Further, $\vec{m}_t$ and $\vec{M}_t$ are transformed to $\tilde{m}$ and $\tilde{M}$, respectively, as provided below in Equation 3 and Equation 4:

$$\tilde{m} = \begin{bmatrix} u_t \\ v_t \\ 1 \end{bmatrix} \quad \text{Equation 3}$$

$$\tilde{M} = \begin{bmatrix} x_t \\ y_t \\ z_t \\ 1 \end{bmatrix} \quad \text{Equation 4}$$

The vectors $\tilde{m}$ and $\tilde{M}$ of Equations 3 and 4, respectively, are expressed in different reference systems and may be expressed in relation to each other based on rotational and transformation matrices.

For example, two reference systems {A} and {B} have a same origin of coordinates and standard bases $\{\hat{i},\hat{j},\hat{k}\}$ and $\{\hat{i}',\hat{j}',\hat{k}'\}$, respectively. A vector expressed in the reference system {A} is represented as $\vec{v}_A$, and the same vector is expressed in the system {B} as $\vec{v}_B = R_B^A \vec{v}_A$, in which $R_B^A$ is the rotation matrix from the reference system {A} to the reference system {B}. $R_B^A$ is represented by Equation 5 provided below:

$$R_B^A = \begin{bmatrix} \hat{i} \cdot \hat{i}' & \hat{j} \cdot \hat{i}' & \hat{k} \cdot \hat{i}' \\ \hat{i} \cdot \hat{j}' & \hat{j} \cdot \hat{j}' & \hat{k} \cdot \hat{j}' \\ \hat{i} \cdot \hat{k}' & \hat{j} \cdot \hat{k}' & \hat{k} \cdot \hat{k}' \end{bmatrix} \quad \text{Equation 5}$$

In examples in which free vectors are utilized, a vector may be transformed from one reference system to another reference via the rotational matrix. In examples in which position vectors are utilized, the vector may be transformed via the rotational matrix and a transformation matrix. For example, if the reference systems {A} and {B} have different origin coordinates, a translation vector, $\vec{t}_A$, translates an origin of {A} to an origin of {B} expressed in the system {A}, and transformation matrix, $T_A^B$, transforms a vector expressed in the reference system {B} to a vector expressed in reference system {A} as illustrated in Equation 6 provided below:

$$\begin{bmatrix} \vec{v}_A \\ 1 \end{bmatrix} = T_A^B \begin{bmatrix} \vec{v}_B \\ 1 \end{bmatrix} = \begin{bmatrix} R_A^B & \hat{t}_A \\ 000 & 1 \end{bmatrix} \begin{bmatrix} \vec{v}_B \\ 1 \end{bmatrix} \quad \text{Equation 6}$$

Returning to the vectors $\tilde{m}$ and $\tilde{M}$ expressed in Equations 3 and 4, the relation between one point of Cartesian 3D space at which the mobile target 2 is located and its projection onto the image obtained by the camera 3 is expressed in terms of the transformed vectors, $\tilde{m}$ and $\tilde{M}$, via Equation 7 provided below:

$$s*\tilde{m} = C*T_C^G*\tilde{M} = C*[R_C^G \hat{t}_C]*\tilde{M} \quad \text{Equation 7}$$

In Equation 7, s represents a scale factor that equals a value corresponding to a function of the relative positions of the camera 3 and the mobile target 2 and characteristics and/or parameters of the camera 3. Further, s is defined by Equation 8 provided below:

$$s = (D_t - f)/f \quad \text{Equation 8}$$

In Equation 8, f is a focal length of the camera 3, and $D_t$ is a distance between the camera 3 and the mobile target 2 that can be measured via, for example, a telemeter on-board the aircraft 1 and directed toward the mobile target 2.

$T_C^G$ of Equation 7 is a transformation matrix (e.g., a rotation and translation matrix) and $\hat{t}_C$ is translation vector for transitioning between a reference system {G} of global coordinates of a Global Reference System and a local reference system {C} of the camera 3 of FIG. 2. Further, C of Equation 7 is an intrinsic matrix of the camera 3 that is defined below in Equation 9:

$$C = \begin{bmatrix} \alpha_u & \gamma & u_0 \\ 0 & \alpha_v & v_0 \\ 0 & 0 & 1 \end{bmatrix} \quad \text{Equation 9}$$

In Equation 9 provided above, $u_0$ and $v_0$ represent a central point of the image obtained by the camera 3, $\alpha_u$ and $\alpha_v$ represent scaling factors of the axes $\hat{u}$ and $\hat{v}$ of the image obtained by the camera 3, and $\gamma$ represents a parameter that defines an orthogonality and/or skewness between the axes $\hat{u}$ and $\hat{v}$ of the plane of the image obtained by the camera 3.

Based on Equations 3-4 and 7-9 provided above, a vector, $\vec{\Psi}_c$, defines a direction in which the aircraft 1 is pointing (e.g., toward the mobile target 2) from its current location and/or coordinates. The vector, $\vec{\Psi}_c$, is expressed in the local reference system of the camera 3 and is provided below in Equation 10:

$$\vec{\Psi}_c = \frac{1}{s} * C^{-1} * \begin{bmatrix} u_t \\ v_t \\ 1 \end{bmatrix} = \frac{1}{s} * \begin{bmatrix} \frac{1}{\alpha_u} & \frac{-\gamma}{\alpha_u * \alpha_v} & \frac{\gamma * v_0}{\alpha_u * \alpha_v} - \frac{u_0}{\alpha_v} \\ 0 & \frac{1}{\alpha_v} & \frac{-v_0}{\alpha_v} \\ 0 & 0 & 1 \end{bmatrix} * \begin{bmatrix} u_t \\ v_t \\ 1 \end{bmatrix} \qquad \text{Equation 10}$$

Equation 10 may be rewritten as provided below in Equation 11:

$$\vec{\Psi}_c = \frac{1}{s} * \begin{bmatrix} \frac{v_t - v_0}{\alpha_v} \\ \frac{u_t}{\alpha_v} - \frac{u_0}{\alpha_v} - \gamma * \frac{v_t - v_0}{\alpha_u * \alpha_v} \\ 1 \end{bmatrix} \qquad \text{Equation 11}$$

Further, the coordinates of the vector, $\vec{\Psi}_c$, that are based in the local reference system {C} of the camera 3 can be translated into coordinates of a vector, $\vec{\Psi}_G$, that are based in the global coordinates {G} of the Global Reference System. The vector, $\vec{\Psi}_G$, is provided below in Equation 12:

$$\vec{\Psi}_G = \begin{bmatrix} \psi_x \\ \psi_y \\ \psi_z \end{bmatrix} = R_U^C * R_G^U * \vec{\Psi}_C \qquad \text{Equation 12}$$

In Equation 12, $R_U^C$ is a rotation matrix between a reference system of the camera 3 and a reference system of the aircraft 1, and $R_G^U$ is a rotation matrix between the reference system of the aircraft 1 and the Global Reference System.

In combination with Equations 11-12 provided above, a parametric equation provided below in Equation 13 is utilized to determine the target position (e.g., the first position) of the aircraft 1 in the global coordinates {G} of the Global Reference System at which the camera 3 is pointed toward the mobile target 2:

$$\begin{bmatrix} x_w \\ y_w \\ z_w \end{bmatrix} = \begin{bmatrix} x_t \\ y_t \\ z_t \end{bmatrix} + \lambda * \vec{\Psi}_G, \qquad \text{Equation 13}$$

Thus, Equation 13 provided above enables the first position of the aircraft 1 that minimizes the area of uncertainty 5 to be determined when $$\begin{bmatrix} x_t \\ y_t \\ z_t \end{bmatrix},$$

$\vec{\Psi}_G$, and $\lambda$ are known and/or determined.

To determine $\lambda$, a quadric or ruled space is defined to express the area of uncertainty 5 associated with the location of the mobile target 2 based on the state vector of Equation 1. The quadric or ruled space is provided below in Equation 14:

$$x^T * Q * x + p^T * x + r = 0,$$

where:

$$x = \begin{bmatrix} x \\ y \\ z \end{bmatrix}, Q = \begin{bmatrix} q_{11} & q_{12} & q_{13} \\ q_{21} & q_{22} & q_{23} \\ q_{31} & q_{32} & q_{33} \end{bmatrix}, p = \begin{bmatrix} p_1 \\ p_2 \\ p_3 \end{bmatrix}, \qquad \text{Equation 14}$$

and r is a constant

In Equation 14 provided above, the terms are inherent to an equation that defines a quadric. For example, if the quadric is an ellipsoid, the condition det(Q)>0 is set on the determinant of the matrix Q, which is an invertible matrix.

To determine a direction and/or module of a major axis 6 and/or minor axis 7 of the ellipsoid of the area of uncertainty 5 corresponding to the mobile target 2, Equation 14 may be rewritten with reference to a center of the ellipsoid as provided below in Equation 15:

$$(x-k)^T * RDR^T * (x-k) = 1 \qquad \text{Equation 15}$$

In Equation 15 provided above, k represents the center of the ellipsoid (e.g., the coordinates of the mobile target 2), R represents a rotation matrix, and D is a diagonal matrix. Based on Equations 15 provided above, Equation 14 can be rewritten as provided below in Equation 16:

$$\begin{aligned}(x-k)^T * Q * (x-k) &= x^T * Q * x - 2 * k^T * Q * x + k^T * Q * k = \\ &(x^T * Q * x + p^T * x + r) - (2 * Q * k + p)^T * x + (k^T * Q * k - r) = \\ &(2 * Q * k + p)^T * x + (k^T * Q * k - r) \qquad \text{Equation 16}\end{aligned}$$

Further, the center of the ellipsoid, k, can be determined as provided below in Equation 17:

$$k = -Q^{-1} * p/2 \qquad \text{Equation 17}$$

Equation 17 can be rewritten as provided below in Equation 18:

$$k^T * Q * k = p^T * Q^{-1} * p/4 \qquad \text{Equation 18}$$

Further, Equation 18 can be rewritten as provided below in Equation 19:

$$(x-k)^T * Q * (x-k) = p^T * Q^{-1} * p/4 - r \qquad \text{Equation 19}$$

By dividing Equation 19 by the scalar, r, Equation 19 can be rewritten as provided below in Equation 20:

$$\Phi = \frac{Q}{(p^T * Q^{-1} * p/4 - r)} \qquad \text{Equation 20}$$

In Equation 20, represents $\Phi$ a quadric. Further, Equation 20 can be rewritten as provided below in Equation 21:

$$(x-k)^T * \Phi * (x-k) = 1 \qquad \text{Equation 21}$$

In Equation 21 provided above, a symmetric matrix of the quadric, $\Phi$, is factored utilizing an eigenvalue decomposition such that $\Phi = R * D * R^T$, in which R is the rotation matrix and D is the diagonal matrix. For example, a main diagonal of the diagonal matrix, D, is composed of positive factors.

In some examples, terrain on which the mobile target 2 is positioned and/or located is known via a Geographic Information System (GIS) database. In such examples, there is substantially no uncertainty of the position of the mobile target in a z-axis. Further, in such examples, uncertainty in an x-y plane (e.g., a horizontal plane) is determined to identify the area of uncertainty 5 of the mobile target 2. In examples in which the uncertainty is an ellipsoid extending in the x-y plane, an eigenvalue decomposition is determined, calculated and/or otherwise analyzed to determine the major axis 6 and the minor axis 7 of the ellipsoid of the area of uncertainty 5. For example, the quadric, $\Phi$, a corresponding eigenvector, $\omega$, and a corresponding eigenvalue, $\lambda$, can be written as provided below in Equation 22 when the eigenvalue, $\lambda$, is a non-null (e.g., non-zero) vector:

$$\Phi * \omega = \lambda * \omega \qquad \text{Equation 22}$$

In Equation 22 provided above, the eigenvalues are determined based on the quadratic equation provided below in Equation 23:

$$\det(\Phi - \lambda * I) = 0, \text{ where}$$

$$\Phi = \begin{pmatrix} \varphi_{11} & \varphi_{12} \\ \varphi_{21} & \varphi_{22} \end{pmatrix} \qquad \text{Equation 23}$$

Based on Equation 23, the eigenvalues $\lambda_1$ and $\lambda_2$ are determined utilizing Equation 24 provided below:

$$\lambda_{1,2} = \frac{(\varphi_{11} + \varphi_{22}) \pm \sqrt[2]{(\varphi_{11} - \varphi_{22})^2 + 4 * \varphi_{12}^2}}{2} \qquad \text{Equation 24}$$

For example, the eigenvalues $\lambda_1$ and $\lambda_2$ that are determined utilizing Equation 24 are utilized in Equation 13 to determine the first position that minimizes the area of uncertainty 5.

Further, the eigenvalues $\lambda_1$ and $\lambda_2$ are utilized to determine the area of uncertainty 5 associated with the mobile target 2. The eigenvalues $\lambda_1$ and $\lambda_2$ can be expressed in Equation 25 and Equation 26 as provided below:

$$\Phi * \omega_1 = \lambda_1 * \omega_1 \qquad \text{Equation 25}$$

$$\Phi * \omega_2 = \lambda_2 * \omega_2 \qquad \text{Equation 26}$$

In Equation 25, $\omega_1$ represents the major axis 6 of the ellipsoid of the area of uncertainty.
In Equation 26, $\omega_2$ represents the major axis 6 of the ellipsoid of the area of uncertainty.
Further, Equations 25 and 26 are rewritten as provided below in Equation 27:

$$\Phi * R = R * D \qquad \text{Equation 27}$$

In Equation 27, $R = [\omega_1 \; \omega_2]$ in which the columns are eigenvectors of unitary length and $D = \text{diag}(\lambda_1; \lambda_2)$. By multiplying the right side of the previous equation by the matrix $R^T$, Equation 28 as provided below is formed:

$$\Phi = R * D * R^T \qquad \text{Equation 28}$$

Thus, the equation that defines the ellipsoid of the area of uncertainty 5 is rewritten in Equation 29 as provided below:

$$(x - k)^T * \Phi * (x - k) = 1 \qquad \text{Equation 29}$$

In Equation 29, the quadric, $\Phi$, corresponds to the covariance matrix $\Sigma$ as provided below in Equation 30:

$$\Phi = \frac{1}{4} * \Sigma^{-1} \qquad \text{Equation 30}$$

The covariance matrix $\Sigma$ of Equation 30 is periodically calculated and/or determined, for example, by a processor of the aircraft 1.

Based on the covariance matrix $\Sigma$, Equation 23, and Equation 30, the major axis, $\omega_1$, (the major axis 6 in FIGS. 3 and 4) and the minor axis, $\omega_2$, (the minor axis 7 in FIGS. 3 and 4) of the area of uncertainty 5 are determined. For example, if $\varphi_{11} \geq \varphi_{22}$, the major axis, $\omega_1$, is determined utilizing Equation 31 provided below and the minor axis, $\omega_2$, is determined utilizing Equation 32 provided below:

$$\omega_1 = \begin{bmatrix} \omega_{1x} \\ \omega_{1y} \end{bmatrix} = \begin{bmatrix} \dfrac{\lambda_1 - \varphi_{22}}{\sqrt{(\lambda_1 - \varphi_{22})^2 + \varphi_{12}^2}} \\ \dfrac{\varphi_{12}}{\sqrt{(\lambda_1 - \varphi_{22})^2 + \varphi_{12}^2}} \end{bmatrix} \qquad \text{Equation 31}$$

$$\omega_2 = \begin{bmatrix} \omega_{2x} \\ \omega_{2y} \end{bmatrix} = \begin{bmatrix} \dfrac{\varphi_{12}}{\sqrt{(\lambda_1 - \varphi_{11})^2 + \varphi_{12}^2}} \\ \dfrac{\lambda_1 - \varphi_{11}}{\sqrt{(\lambda_1 - \varphi_{11})^2 + \varphi_{12}^2}} \end{bmatrix} \qquad \text{Equation 32}$$

Otherwise, if $\varphi_{11} < \varphi_{22}$, the major axis, $\omega_1$, is determined utilizing Equation 33 provided below and the minor axis, $\omega_2$, is determined utilizing Equation 33 provided below:

$$\omega_1 = \begin{bmatrix} \omega_{1x} \\ \omega_{1y} \end{bmatrix} = \begin{bmatrix} \dfrac{\varphi_{12}}{\sqrt{(\lambda_1 - \varphi_{11})^2 + \varphi_{12}^2}} \\ \dfrac{\lambda_1 - \varphi_{11}}{\sqrt{(\lambda_1 - \varphi_{11})^2 + \varphi_{12}^2}} \end{bmatrix} \qquad \text{Equation 33}$$

$$\omega_2 = \begin{bmatrix} \omega_{2x} \\ \omega_{2y} \end{bmatrix} = \begin{bmatrix} \dfrac{\lambda_1 - \varphi_{22}}{\sqrt{(\lambda_1 - \varphi_{22})^2 + \varphi_{12}^2}} \\ \dfrac{\varphi_{12}}{\sqrt{(\lambda_1 - \varphi_{22})^2 + \varphi_{12}^2}} \end{bmatrix} \qquad \text{Equation 34}$$

The axes of the area of uncertainty 5 can change dynamically as the determined location of the mobile target 2 changes based on new and/or additional data and/or information obtained regarding the mobile target 2 and/or the aircraft 1.

Returning to determining the first position of the aircraft 1 that minimizes the area of uncertainty 5, the first position can be determined utilizing Equations 11-13 and 24 given some constraints and/or assumptions. For example, a constraint that the mobile target 2 is to be centered in the image obtained by the camera 3 of the aircraft is represented by Equation 35 provided below:

$$\vec{m_t} = \begin{bmatrix} u_t \\ v_t \end{bmatrix} = \begin{bmatrix} w/2 \\ h/2 \end{bmatrix} \qquad \text{Equation 35}$$

In Equation 35, w represents a number of pixels of a width of the image obtained by the camera 3, and h represents a number of pixels of a height of the image obtained by the camera 3. The values of Equation 35 are utilized to determine the values of $\Psi_{cx}$ and $\Psi_{cy}$ in Equation 11, which are utilized to determine $x_w$ and $y_w$ of the location that minimizes the area of uncertainty 5.

Additionally or alternatively, another constraint requires that $z_w$ of the location that minimizes the area of uncertainty 5 is assumed to equal $z_\pi$. $z_\pi$ represents an altitude of the aircraft 1 that is determined based on, for example, an instantaneous field of view (IFOV) of the camera 3 and a size of the mobile target 2. In some examples, $z_\pi$ equals the size of the mobile target 2 divided by the IFOV of the camera 3. For example, based on the constraint regarding the altitude of the aircraft 1, Equation 13, which represents the first position of the aircraft 1, can be rewritten as provided below in Equation 36:

$$\begin{bmatrix} x_w \\ y_w \\ z_w \end{bmatrix} = \begin{bmatrix} x_t + (z_\pi) * \frac{\psi_x}{\psi_z} \\ y_t + (z_\pi) * \frac{\psi_y}{\psi_z} \\ z_\pi \end{bmatrix} \quad \text{Equation 36}$$

Further, another constraint may require the camera 3 to be aligned with a plane of symmetry of the aircraft 1 and inclined at the angle θ (FIG. 2) with respect to the fuselage 4 of the aircraft 1. As a result, the rotational matrix, $R_U^C$, which is utilized to determine the first location of the aircraft 1, is represented by the matrix provided below in Equation 37:

$$R_U^C = \begin{bmatrix} 0 & \sin\theta & \cos\theta \\ 1 & 0 & 0 \\ 0 & \cos\theta & -\sin\theta \end{bmatrix} \quad \text{Equation 37}$$

To determine the rotational matrix, $R_G^U$, other constraints and/or assumptions are made. For example, the roll angle, $\gamma_w$, and the pitch angle, $\beta_w$, are assumed to equal 0. Further, the yaw angle, $\alpha_w$, of the camera 3 is focused on the mobile target 2 in a direction that is perpendicular to the major axis, $\omega_1$, of the area of uncertainty 5. The yaw angle, $\alpha_w$, is determined based on Equation 38 provided below:

$$\alpha_w = \frac{\pi}{2} - \tan^{-1}\left(-\frac{\omega_{1x}}{\omega_{1y}}\right) \quad \text{Equation 38}$$

For example, in Equation 38, an angle of 0 degrees is directed to the north and a positive angle is clockwise from the north.

Based on the constraints regarding the roll angle, $\gamma_w$, the pitch angle, $\beta_w$, and the yaw angle, $\alpha_w$, the rotational matrix, $R_G^U$, which is utilized to determine the first location of the aircraft 1, is represented by the matrix provided below in Equation 37:

$$R_G^U = \begin{bmatrix} \sin\alpha_w & \cos\alpha_w & 0 \\ \cos\alpha_w & -\sin\alpha_w & 0 \\ 0 & 0 & -1 \end{bmatrix} \quad \text{Equation 39}$$

For example, the yaw angle, $\alpha_w$, of Equation 39 is calculated based on Equation 38.

Based on the following constraints, two positions that minimize the area of uncertainty 5 are determined because eigenvalues λ of Equation 24 is a quadratic equation. The aircraft 1 is to move to the one of the two positions, $$\begin{bmatrix} x_{w1} \\ y_{w1} \end{bmatrix} \text{ or } \begin{bmatrix} x_{w2} \\ y_{w2} \end{bmatrix}$$

that is closest to the current coordinates, $$\begin{bmatrix} x \\ y \end{bmatrix}.$$

The closer of the two positions of the aircraft 1 is determined based on Equation 40 provided below:

$$\begin{aligned} \text{If } & \sqrt{(x_{w1} - x_0)^2 + (y_{w1} - y_0)^2} \leq \\ & \sqrt{(x_{w2} - x_0)^2 + (y_{w2} - y_0)^2}, \\ \text{then } & y_{w1} - y_t = -\frac{\omega_{1x}}{\omega_{1y}}(x_{w1} - x_t), \\ \text{otherwise } & y_{w2} - y_t = -\frac{\omega_{1x}}{\omega_{1y}}(x_{w2} - x_t) \end{aligned} \quad \text{Equation 40}$$

Thus, if the first equation of Equation 40 is true, the aircraft 1 is to move to $$\begin{bmatrix} x_{w1} \\ y_{w1} \end{bmatrix}$$

to deduce the area of uncertainty 5. Otherwise, the aircraft 2 is to move to $$\begin{bmatrix} x_{w2} \\ y_{w2} \end{bmatrix}$$

to deduce the area of uncertainty 5.

Figure 4:
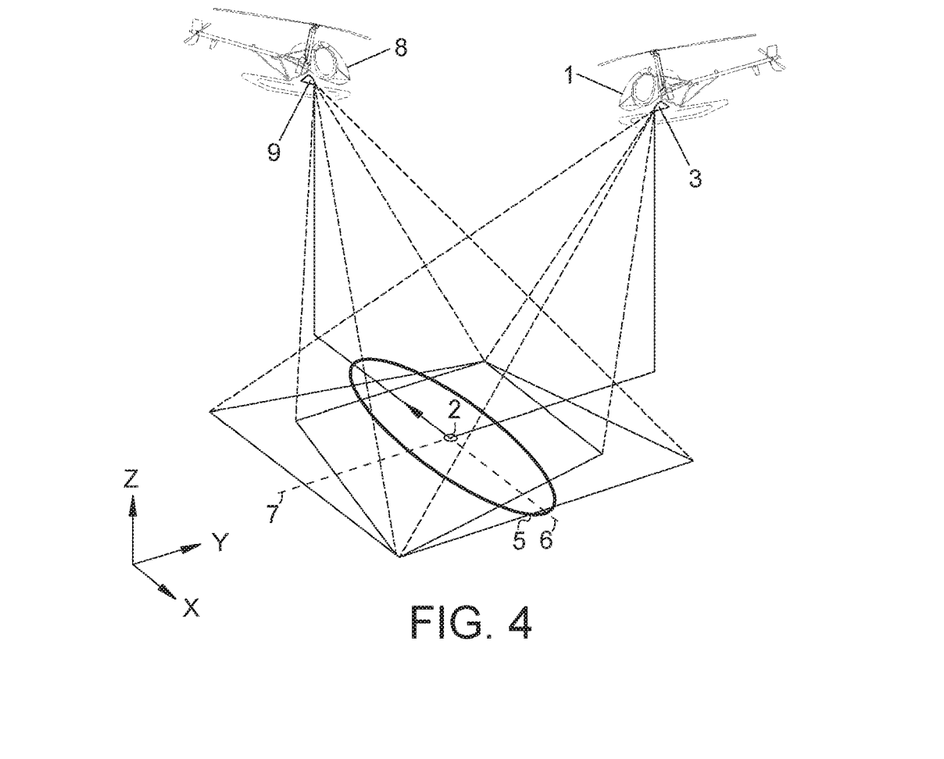
FIG. 4 illustrates the aircraft of FIG. 1 and another aircraft positioned to further reduce the area of uncertainty for the coordinates of the mobile target of FIG. 3 in accordance with the teachings of his disclosure.

FIG. 4 illustrates the aircraft 1 and another aircraft 8 positioned to reduce the area of uncertainty 5 of the mobile target 2 in accordance with the teachings of his disclosure. As illustrated in FIG. 4, the aircraft 8 includes a camera 9. The aircraft 8 and the camera 9 of FIG. 4 are substantially similar or identical to the aircraft 1 and the camera 3, respectively, of FIGS. 3-4. Because the aircraft 1 and the camera 3 are described in detail in connection with FIG. 3, some characteristics of the aircraft 1 and the camera 3 are not described in further detail below.

In the illustrated example, the camera 3 of the aircraft 1 is focused on the mobile target 2 in a direction that is perpendicular to the major axis 6 (the major axis, $\omega_1$, in the above equations) of the area of uncertainty 5, and the camera 9 of the aircraft 8 is focused on the mobile target 2 in a direction that is perpendicular to the minor axis 7 (the minor axis, $\omega_2$, in the above equations) of the area of uncertainty 5. For example, the aircraft 1 is in the first position that is orthogonal to the major axis 6 along the minor axis 7 and the aircraft 8 is in a second position (e.g., a second principal position) along the major axis 6 orthogonal to the minor axis 7. The aircraft 1, 8 track the mobile target 2 from substantially perpendicular positions and/or directions to further reduce the area of uncertainty 5 related to the determined position of the mobile target 2.

Figure 5:
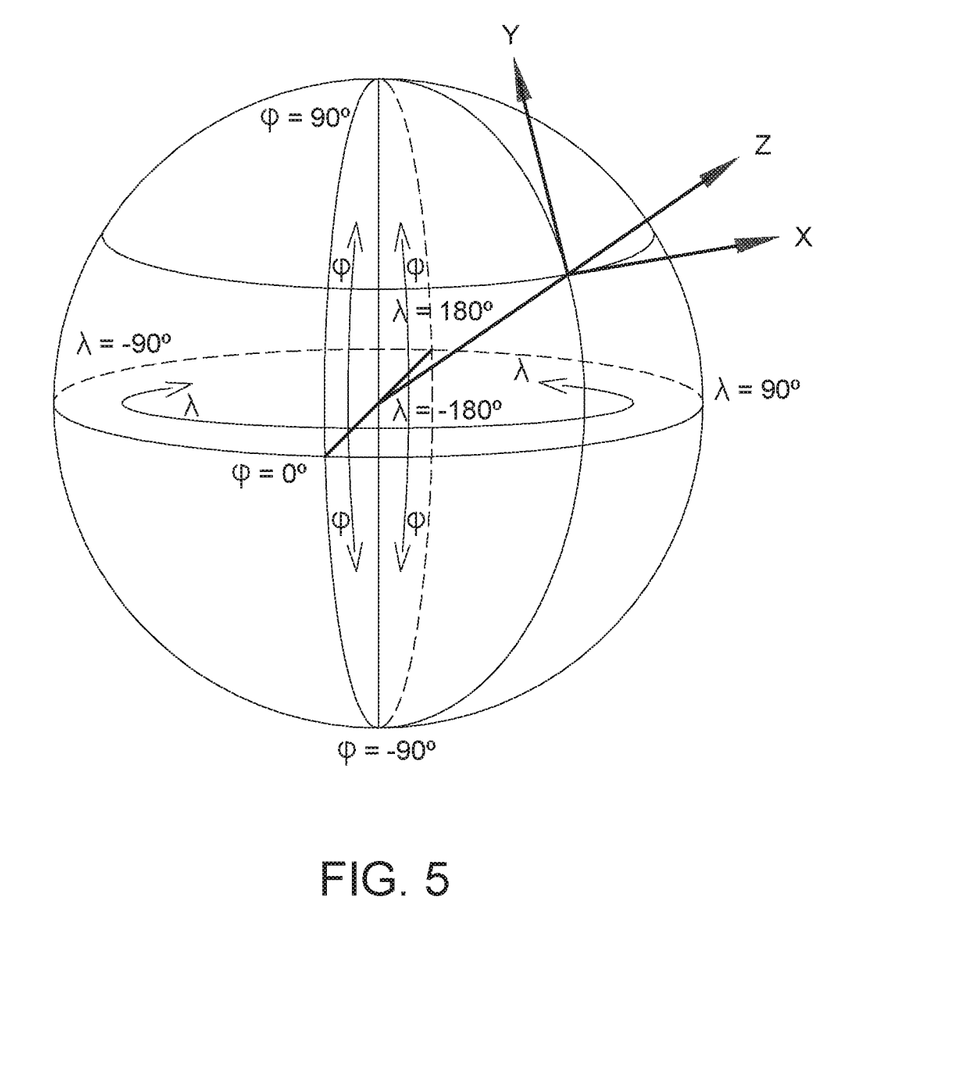
FIG. 5 depicts a global positioning system utilized to determine coordinates of the aircraft of FIGS. 1-4, the other aircraft of FIG. 4 and/or the mobile target of FIGS. 3-4.

FIG. 5 depicts the Global Reference System, {G}, utilized to determine coordinates of the aircraft 1 (FIGS. 1-4), the aircraft 8 (FIG. 4) and/or the mobile target 2 (FIGS. 3-4). In the illustrated example, the x̂ axis points to the east, the ŷ axis points to the north, and the ẑ axis is extends between the center of the Earth and the mobile target 2.

Figure 6:
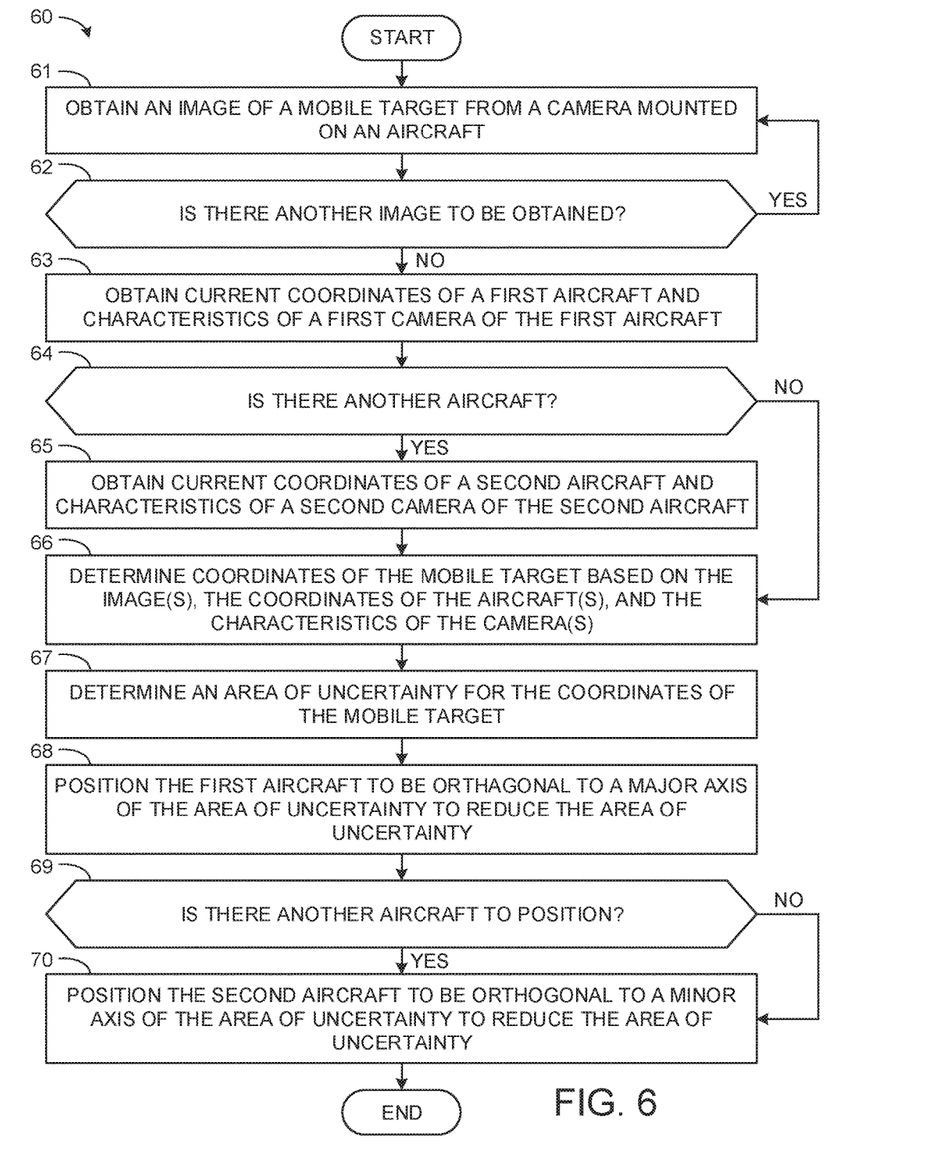
FIG. 6 is a flowchart representative of an example method to position the aircraft of FIGS. 1-4 and/or the other aircraft of FIG. 4 to reduce the area of uncertainty for the coordinates of the mobile target of FIGS. 3-4 in accordance with the teachings herein.

FIG. 6 is a flowchart representative of an example method 60 to position aircraft(s) to reduce an area of uncertainty of coordinates of a mobile target in accordance with the teachings herein. Although the example method 60 is described with reference to the flowchart illustrated in FIG. 6, many other methods for positioning the aircraft(s) to reduce the area of uncertainty of the coordinates of the mobile target may alternatively be used. For example, the order of execution of the blocks may be changed, and/or some of the blocks described changed, eliminated, and/or combined.

Further, the blocks of the example method 60 may be implemented by executing corresponding instructions (e.g., first instructions, second instructions, third instructions, etc.) via a processor. For example, the processor is hardware of the example aircraft 1 and/or the example aircraft 8. The processor can be implemented by one or more integrated circuits, logic circuits, microprocessors or controllers from any desired family or manufacturer. In some examples, the processor includes a local memory (e.g., a cache). In some examples, the memory includes volatile memory and/or non-volatile memory. Example volatile memory may be implemented by Synchronous Dynamic Random Access Memory (SDRAM), Dynamic Random Access Memory (DRAM), RAMBUS Dynamic Random Access Memory (RDRAM) and/or any other type of random access memory device. Example non-volatile memory may be implemented by flash memory and/or any other desired type of memory device. Access to the memory is controlled, for example, by a memory controller. In some examples, the memory is a tangible computer readable storage medium such as a flash memory, a read-only memory (ROM), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. In some examples, the memory is a non-transitory computer and/or machine readable medium such as a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media.

The method 60 for positioning aircraft(s) to reduce an area of uncertainty of coordinates of a mobile target is discussed in connection with the aircraft 1 of FIGS. 1-4, the aircraft 8 of FIG. 4, the mobile target 2 of FIGS. 3-4 and/or the area of uncertainty 5 of FIGS. 3-4. Further, because the method 60 may refer to the aircraft 1 of FIGS. 1-4, the aircraft 8 of FIG. 4, the mobile target 2 of FIGS. 3-4 and/or the area of uncertainty 5 of FIGS. 3-4, components identified in FIGS. 1-4 having functions substantially similar or identical to the functions of components described below will not be described in detail again. Instead, the same reference numbers will be used for like structures.

The example method 60 disclosed herein starts at block 61 by a camera (e.g., the camera 3 of FIGS. 2-4, the camera 9 of FIG. 4) mounted to an aircraft (e.g., the aircraft 1 of FIGS. 1-4, the aircraft 8 of FIG. 4) obtaining an image of a mobile target (e.g., the mobile target 2 of FIGS. 3-4). At block 62, the method 60 includes determining whether there is another image to be obtained. Blocks 61, 62 are repeated until all of the images to be obtained of the mobile target are obtained.

At block 63, current coordinates of a first aircraft (e.g., the aircraft 1 of FIGS. 1-4, the aircraft 8 of FIG. 4) and characteristics of a first camera (e.g., the camera 3 of FIGS. 2-4, the camera 9 of FIG. 4) of the first aircraft are obtained. At block 64, the method 60 includes determining whether there is another aircraft. If there is another aircraft, current coordinates of a second aircraft (e.g., the aircraft 1 of FIGS. 1-4, the aircraft 8 of FIG. 4) and characteristics of a second camera (e.g., the camera 3 of FIGS. 2-4, the camera 9 of FIG. 4) of the second aircraft are obtained (block 65).

Upon determining that there is not another aircraft or upon obtaining the coordinates of the second aircraft and the characteristics of the corresponding camera, coordinates of the mobile target are determined based on the image(s) obtained from the camera, the coordinates of the aircraft(s), and the characteristics of the camera(s) (block 66). Further, an area of uncertainty (e.g., the area of uncertainty 5 of FIGS. 3-4) is determined for the coordinates of the mobile target (block 67).

At block 68, the first aircraft is positioned to be orthogonal to a major axis (e.g., the major axis 6 of FIGS. 3-4) of the area of uncertainty to reduce the area of uncertainty of the mobile target. For example, the first aircraft is positioned to be along a minor axis (e.g., the minor axis 7 of FIGS. 3-4) of the area of uncertainty. At block 69, the method 60 determines if there is another aircraft to position. If there is not another aircraft, the method 60 ends. If there is another aircraft to be positioned, the second aircraft is positioned to be orthogonal to the minor axis of the area of uncertainty to further reduce the area of uncertainty of the mobile target (block 70). For example, the second aircraft is positioned to be along the major axis of the area of uncertainty. In some examples, the area of uncertainty, the first position of the first aircraft and/or the second position of the second aircraft is changed and/or updated dynamically as new data and/or information is obtained regarding the aircraft(s) and/or the mobile target.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A method comprising:
   identifying, by executing an instruction with a processor, a mobile target in an image obtained by a camera mounted on a first aircraft;
   obtaining, by executing an instruction with the processor, current coordinates of the first aircraft;
   determining, by executing an instruction with the processor, estimated coordinates of the mobile target based on the current coordinates of the first aircraft and the image;

determining, by executing an instruction with the processor, an area of uncertainty of the estimated coordinates of the mobile target using a covariance matrix, the area of uncertainty being an elliptical shape with a major axis and a minor axis; and determining, by executing an instruction with the processor, a first position for the first aircraft that reduces the area of uncertainty of the estimated coordinates of the mobile target, the first position being orthogonal to the major axis and along the minor axis.

2. The method of claim 1, wherein obtaining the current coordinates of the first aircraft includes receiving data via a global positioning sensor of the first aircraft.

3. The method of claim 1, wherein determining the first position to reduce the area of uncertainty includes determining the first position to minimize the area of uncertainty.

4. The method of claim 1, wherein determining the first position for the first aircraft that reduces the area of uncertainty is based on at least one of the estimated coordinates of the mobile target, the current coordinates of the first aircraft, the image obtained by the camera, a focal length of the camera, an angle of the camera relative to a fuselage of the first aircraft, or a yaw angle of the first aircraft.

5. The method of claim 1, wherein determining the estimated coordinates of the mobile target based on the current coordinates of the first aircraft and the image includes determining 3-dimenisional coordinates of the mobile target, the current coordinates of the first aircraft being 3-dimensional, the image obtained by the camera being 2-dimensional.

6. The method of claim 1, further including determining a distance between the first aircraft and the mobile target to determine the estimated coordinates of the mobile target based on the current coordinates of the first aircraft and the image.

7. The method of claim 1, wherein determining the first position of the first aircraft includes identifying two positions along the minor axis that minimize the area of uncertainty and determining which one of the two positions is closest to the current coordinates of the first aircraft.

8. The method of claim 1, wherein identifying the mobile target is further based on a second image obtained by a second camera mounted on a second aircraft.

9. The method of claim 8, further including:
obtaining current coordinates of the second aircraft;
determining the estimated coordinates of the mobile target further based on the current coordinates of the second aircraft and the second image; and
determining a second position for the second aircraft that reduces the area of uncertainty of the estimated coordinates of the mobile target.

10. The method of claim 9, wherein determining the second position of the second aircraft that reduces the area of uncertainty includes determining a position orthogonal to the minor axis and along the major axis of the area of uncertainty.

11. The method of claim 1, further including moving the first aircraft to the first position to enable the camera of the first aircraft to obtain a second image, the mobile target being centered in the second image.

12. The method of claim 1, further including determining at least one of a size, a color, or a velocity of the mobile target to determine a classification of the mobile target.

13. An apparatus comprising:
a camera mounted to an aircraft to obtain an image; and
a processor of the aircraft to:
identify a mobile target in the image obtained by the camera;
obtain current coordinates of the aircraft;
determine an area of uncertainty and coordinates of the mobile target within the area of uncertainty based on the coordinates of the aircraft and the image, the area of uncertainty being an elliptical shape having a major axis and a minor axis;
determine a position for the aircraft that reduces the area of uncertainty of the coordinates of the mobile target, the position being orthogonal to the major axis and along the minor axis; and
instruct the aircraft to move to the position to reduce the area of uncertainty.

14. The apparatus of claim 13, further including a global positioning sensor of the aircraft, the processor to obtain the current coordinates of the aircraft via the global positioning sensor.

15. The apparatus of claim 13, wherein the camera has a focal length and is positioned at an angle relative a fuselage of the aircraft, the processor of the aircraft determines the position of the aircraft that reduces the area of uncertainty based on at least one of the focal length or the angle of the camera.

16. The apparatus of claim 13, wherein the camera is to obtain a second image when the aircraft is at the position that reduces the area of uncertainty, the mobile target being centered in the second image.

17. An apparatus comprising:
means for obtaining an image of a mobile target, the means for obtaining an image being mounted to an aircraft;
means for determining a position of the aircraft to identify the mobile target in an image obtained by the means for obtaining an image, obtain current coordinates of the aircraft, determine coordinates of the mobile target and an area of uncertainty based on the coordinates of the aircraft and the image, the area of uncertainty based on a covariance matrix, the area of uncertainty being elliptical shaped and having a major axis and a minor axis, and determine a position for the aircraft that reduces the area of uncertainty, the position being orthogonal to the major axis and along the minor axis; and
means for moving the aircraft to the position to reduce the area of uncertainty.

18. The method of claim 1, wherein the first aircraft is a rotorcraft.

19. The method of claim 1, wherein the major axis and the minor axis intersect at the estimated coordinates of the mobile target.

20. The method of claim 1, wherein determining the area of uncertainty is further based on an estimated velocity of the mobile target, the major axis of the area of uncertainty being aligned with the estimated velocity.

* * * * *